United States Patent [19]

Mannheim

[11] Patent Number: 4,879,183

[45] Date of Patent: Nov. 7, 1989

[54] METHOD TO MANUFACTURE A BLINDAGED GLASS

[76] Inventor: Jose R. Mannheim, Av. La Pradera 164, Lima, Peru

[21] Appl. No.: 89,994

[22] Filed: Aug. 27, 1987

[30] Foreign Application Priority Data

Jul. 8, 1987 [PE] Peru ........................ 123453

[51] Int. Cl.⁴ .................... B32B 17/10; B32B 27/40
[52] U.S. Cl. ................................ 428/437; 428/911
[58] Field of Search ............. 428/437, 426, 430, 431, 428/436, 441, 911

[56] References Cited

U.S. PATENT DOCUMENTS 3,406,086 10/1968 Foster ........................... 428/437 X
3,458,388 7/1969 Moynihan ...................... 428/437 X

*Primary Examiner*—Nancy A. B. Swisher
*Attorney, Agent, or Firm*—Fleit, Jacobson, Cohn, Price, Holman & Stern

[57] ABSTRACT

Method for the manufacturing of blindaged glass that detains the trajectory of projectiles shot by firearms, characterized by the formation of a transparent and limpid composition constituted by a rigid zone of impact, an intermediate elastic and adhesive zone and a mixed third zone of protection and antilacerative.

The rigid zone is composed of a laminated glass; the intermediate zone is composed of a plurality of layers of PVB or of polyurethane; the final mixed zone is composed by a glass sheet laminated with a thin polycarbonate layer which is covered by a transparent film of antiabrasive material. These blindage glass can be curved so as to be used in automobiles.

6 Claims, 2 Drawing Sheets

METHOD TO MANUFACTURE A BLINDAGED GLASS

BACKGROUND OF THE INVENTION

The present invention relates to the manufacture of blindaged glass to stop the trajectory of projectiles shot by firearms, and more particularly the invention relates to a light blindaged glass that protects the user against a fired projectile and against the glass fragments of the interior glass layer, and that said blindaged glass manufactured in accordance to the invention can be curved to be used in automobiles.

Due to the violence that has unraveled and extended in many countries and the indiscriminated use of firearms from politic extremists, fanatics and delinquents, it is also extending the use of automotive blindaged vehicles to protect both the passanger and the driver from these acts of vandalism.

It is logical that this type of vehicles must have heavy blindages in vital parts of the body creating a strong overweight that requires an engine of much greater power than the normal and, likewise, means of suspension, shock absorbance and brakes with a much greater degree of resistance. But to all that should be added the high weight of the blinkage crystals usually used in the front windshield, the back crystal and the small windows crystals which, due to the thickness that they must have and the high specific density of the glass, its total weight is high and excessively overcharges the weight of the blindaged vehicle with the correspondent incidence in the means of suspension, shock absorvence and brakes.

It should be considered that said blindage crystals are not only used in passenger vehicles but also in vehicles used to carry securities and even to be used in certain offices, establishments and dwellings, for which reason its excessive weight represents a limitative factor for said usage.

The conventional blindaged glass has scarcely distantiated from its original conception, that is the placement and lamination of a plurality of glass sheets with interposed films of polyvinyl butyral, being possible to laminate up to 12 sheets of glass with their correspondent interposed layers of polyvinyl butyral. To lessen the weight of these blindaged glasses and avoid the lacerating action of the fragments and glass splinters of the last sheet which confronts the user, it has been proposed, although with little success, to substitute part of the glass sheets with polycarbonate sheets that show good resistance to the perforation and temperature of the projectile. In such way said antibullet glasses are formed by three zones: the first one, by laminated glass; the second one, a vacuum chamber confines within a frame of elastomeric material, that allows the expansion of the projectile and the third one, formed by very thick layers of polycarbonate for the contention purposes. The main inconvenience of this method is the impossibility of curving said blindaged crystals altogether with the polycarbonate, in a symmetric and regular form with the empty space, to form a entirety that substitutes the conventional blindaged glass for automobiles, for which reason this product can only be obtained in a planar form.

The most recent technique proposes the placement of a polycarbonate sheet in the interior of a compound of laminated glasses with polyvinyl butyral.

This sheet of polycarbonate that normally has 6 mm. of thickness, allows to reduction of the number of glass sheets with which is obtained a reduction in the total weight of the product. However, the disadvantage of this blindaged compound is that such thick sheet of polycarbonate suffers with the changes of temperature, contractions and expansions so extended that can not be absorbed by the layers of polyurethane used as adherent, which causes delaminations (separation of sheets), loosing like that the compound resistance and the visibility that it should have.

SUMMARY OF THE INVENTION

Considering the problems that I have exposed, I have created a new and original blindaged glass which is constituted by a rigid zone of sacrifice, a elastic zone of shock absorbance and energy absorption and a zone of protection and antilaceration, lessening like that remarkably the total weight of the blindaged glass and protecting the user at the same time, against the lacerating effects, allowing at the same time that such blindaged glass be curved to be used in the windshield and windows of the automobile.

The invention consists in laminating one or more glass sheets to form a first rigid and resultant zone, called layer of sacrifice, followed by a plurality of superposed layers of polyvinyl butyral or of polyurethane, preferently between 12 to 30 layers, between which can be interposed very thin sheets of polycarbonate to form a second zone, or contention zone, that lessens the speed of the projectile and absorves its kine energy, followed by a third antilacerative layer formed by a laminated glass sheet and a thin sheet of polycarbonate protected externally by a film of antiabrasive material permanent or replaceable.

According to the invention the sacrifice zone is of sufficient and adequate thickness to the type of projectile for which the blindaged glass is manufactured, being able to be formed by a sheet of three crystals of 2.5 mm. of thickness or only of one of 3 to 5 mm. of thickness, but it is preferred that this first zone be formed by laminated glasses, being them raw or hardened or mixtures of them. In the same way, the opposite zone or antilacerative zone is preferable to be formed by a laminated glass sheet, by means of a polyurethane film, with a sheet of polycarbonate which is covered externally by a film of antiabrasive material to prevent rulings and flayings of the polycarbonate sheet and keep it always limpid and transparent, being able to be substituted such polycarbonate sheet by two polyester adhered sheets.

An objective of the present invention is to provide a blindaged glass of low weight in relation to the conventionals and that is impassable by the projectiles shot by firearms of short cannon or long cannon.

Another objective of the present invention is to provide a blindaged glass that protects the user from lacerations produced by the splintering and fragmentation of the glass sheet that confronts said user.

One more objective of the present invention is to provide a blindaged glass with antilacerative protection having an internal body that confronts the user which can be exchanged to keep it continuously limpid and transparent.

Another objective of the present invention is to provide a blindaged glass of easy manufacturing and instalation and that can be curved to be used in the windshield and windows of the automobile.

These and other additional advantages can still be easily appreciated in the description and drawings enclosed which show, as an example, a preferred way of realizing the invention, the same being exposed for purely illustrative purposes without restriction of its real conception and extention which is defined in the correspondent claims enclosed.

To understand better the characteristics of the invention there are enclosed the figures in which.

Figure 1:
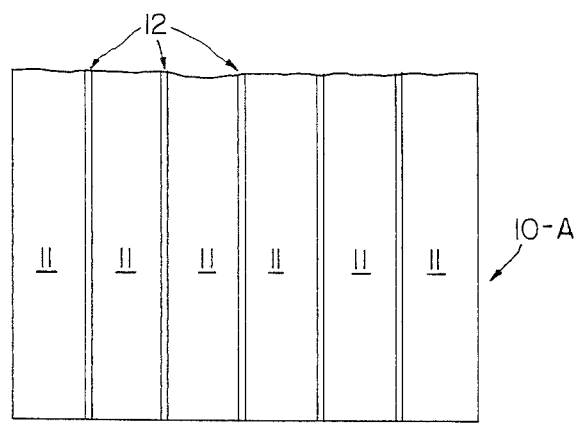
FIG. 1 represents a view, in transversal cut, of a conventional blindaged glass completely formed of laminated glass sheets with polyvinyl butyral, showing the great number of glass sheets and its considerable weight and thickness.

With regard to the figures, it is repesented with 10-A in FIG. 1, a conventional blindaged glass formed by a plurality of laminated glass sheets 11 with films 12 of polyvinyl butyral or polyurethane. These sheets 12 can be of uniformed thickness or may have different thickness according to their position, with the judgment that the projectile in the measure that breaks and crosses each glass sheet looses part of its speed and kinetic strenght. For this reason the thickness of the blindaged glass is based on the greater resistance that it offers to the course of the projectile.

Figure 2:
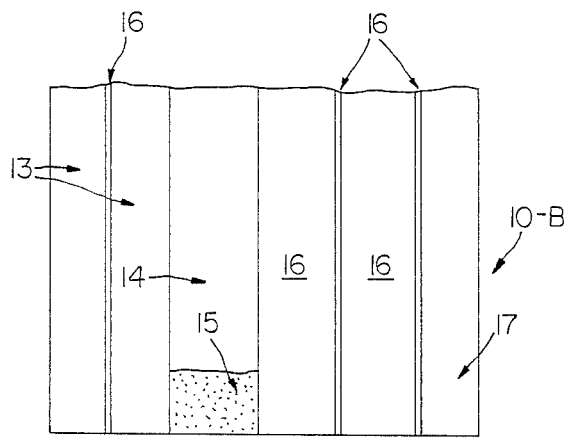
FIG. 2 represents a view, in transversal cut, of a plain safety glass provided of an intermediate chamber of expansion vacuum to absorbe the kinetic energy of the projectile, showing the great thickness and weight of the blindaged compound.

In FIG. 2 is shown a blindaged glass 10-B in which has been introduced the concept of absorption of the kinetic energy in an hermetic vacuum chamber. In this kind of blindaged glass, the front 13 sheets of glass are laminated with a film 16 of polyvinyl butyral and form part with the rigid sheets of glass 16 or polycarbonate or similar and with the frame 15 of elastomeric material, an extended hermetic chamber in which has been made the vacuum, so when that vacuum is broken by the passage of the projectile, produces an implosion that absorbes a significant part of the kinetic energy of said projectile, loosing the remaining when crossing sheets 16 and 17 laminated with adherent 16.

Although the concept on which this blindaged glass is grounded is very interesting, its effectiveness is very relative and can only be manufactured in a plain form and stays vulnerable to a second shot due to the loss of vacuum with the first shot.

Figure 3:
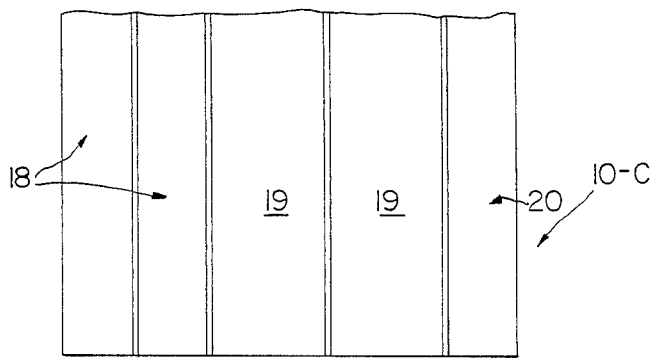
FIG. 3 represents a view, in transversal cut, of a blindaged glass incorporating polycarbonate sheets in accordance to the conventional method, showing the great thickness of these polycarbonate sheets with regard to the thickness of the glass sheets and the shock absorbence.

On the blindaged glass 10-C of FIG. 3, with the object of alleviating the weight of the blindaged glass 10-A of FIG. 1, some of the glass sheets 11 have been substituted by thick polycarbonate sheets 19 maintaining the laminated glass sheets to resist the impact. These polycarbonate sheets have much lower specific weight than glass and are laminated between themselves and the glass sheets, through polyurethane films that is a good adhesive with the polycarbonate. The last sheet 20 of this type of glass is formed by a thinner polycarbonate sheet 20, as shown in FIG. 3. This kind of blindaged glass, even though is lighter than the conventional and can be curved to be used in vehicles, has the disadvantage of its great thickness, of its easiness to delaminate and distort the visibility and to get scratched and suffer flayings the external surface of the polycarbonate sheet 20.

Figure 4:
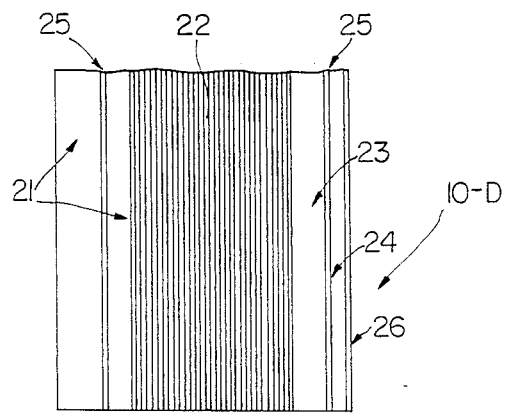
FIG. 4 represents a view, in transversal cut, of the blindaged glass of the invention showing its three zones clearly defined by their functions and effects, to provide protection to the user.

The blindaged glass of the invention shown by 10-D in FIG. 4, es composed by a first rigid zone formed by the laminated glasses 21 with the correspondent interposed film 25 of polyvinyl butyral or of polyurethane, forming like this the so sacrifice zone. This sacrifice layer is not necessarily formed by two glass sheets, in accordance with the greater resistance desired to be offered to the projectiles impact due to its calibre. This first rigid zone, when receiving the impact of the projectile produces its flattening, losing its conical form and its rotatory movement, but keeping great part of the speed and kinetic energy. Adjacent to this sacrifice zone is found a plurality of PVB or of polyurethane sheets 22, or mixtures of both of them, forming a thick, melted zone of elastic and adhesive material. This zone can be formed by 12 to 30 PVB or polyurethane sheets, if desired with thin interposed polycarbonate sheets. This elastic and adhesive zone not only absorbes the kinetic energy of the projectile but also mitigates its speed, due to the very high friction offered to the passage of such projectile, until this speed is reduced in such a way that the projectile loses its impulsion strength. On this condition the projectile collides with the glass sheet 23, the same that with difficulty will be able to break, reducing almost to cero its energy and speed, being detained. But due to this last breakage, by the impact or only by the increase of its temperature, due to the transformation of the projectile's live energy into calorific energy caused by the impact and friction, said last glass sheet fragmentates and splinters creating sometimes serious lacerations in the people located behind the blindaged glass. To avoid this, the invention includes a thin polycarbonate sheet 24 together with a polyurethane film 25. This glass sheet 23 and the polycarbonate sheet is covered by a thin film 26 of antiabrasive, renewable or replaceable material, such as a silicone and a thin polyester sheet that can be replaced when desired.

As an alternative of the invention, the third zone of the blindaged glass, or the antilacerative zone, the glass sheet 23 can be covered by a first polyester sheet of approximately 0.020 inches of thickness adhered to a second polyethylene sheet of approximately 0.005 inches of thickness. Both sheets are united between themselves and with the glass sheet by polyurethane films.

The glass sheet 23 is fundamental in the constitution of the inventions blindaged glass because is necessary to keep the simetry and uniformity of the compunds curvature since said sheet, being placed at a distance of the primary lamination which forms the sacrifice layer, has to keep the same curvature but with a smaller radio, so that the blindaged glass thickness can be exactly the same in any part of its surface. This uniformity on the glass thickness gives it a perfect transparence, without distortion of the light beams.

Having in this way described the groundings of the invention and the way to put it on practice, I claim as of my exclusive property the following clauses:

1. Blindaged glass, comprising the following laminated parts:

a first and outer rigid sacrifice sheet formed by a laminated glass sheet;

an intermediate and elastic expansion core adjoining said first and outer rigid impact element, said intermediate and elastic expansion core being formed by a smelted bulk of about eighteen to thirty smelted layers of polyvinyl butyral with about 0.5 inch to 0.8 inch in thickness; and a third and rigid protective element adjacent to said intermediate and elastic core, said third and rigid protective element being formed by a laminated assembly of a glass sheet bonded with a last and outer polycarbonate sheet.

2. A blindaged sheet of claim 1 wherein said sacrifice sheet is an assembly formed by two glass sheets bonded with an interposed polyvinyl butyral plasticized layer.

3. The blindaged glass of claim 1 wherein said sacrifice sheet is an assembly formed by two glass sheets bonded with a polyurethane plasticized layer.

4. Blindaged glass, comprising the following laminated parts:

a first and outer rigid impact sacrifice sheet formed by a laminated glass sheet;

an intermediate and elastic expansion core adjoining said first and outer rigid impact element, said intermediate and elastic expansion core being formed by a smelted bulk of about eighteen to thirty smelted layers of polyurethane with about 0.5 inch to 0.8 inch in thickness; and a third and rigid protective element adjacent to said intermediate and elastic core, said third and rigid protective element being formed by a laminated assembly of a glass sheet bonded with a last and outer polycarbonate sheet.

5. A blindaged antibullet glass, comprising the following laminated parts:

(a) a first and outer rigid impact sacrifice sheet formed by a laminated glass sheet;

(b) an intermediate and elastic expansion core about 0.5 inch to about 0.8 inch in thickness adjoining said first and outer rigid impact element, said intermediate and elastic expansion core being formed by a smelted bulk of a plurality of sheets selected from the group consisting essentially of polyvinyl butyral and polyurethane; and (c) a third and rigid protective element adjacent to said intermediate and elastic expansion core, said third and rigid protective element being formed by a laminated assembly of a glass sheet bonded with a last and outer polycarbonate sheet.

6. A blindaged antibullet glass, comprising the following laminated parts:

(a) a first and outer rigid impact sacrifice sheet formed by a laminated glass sheet;

(b) an intermediate and elastic expansion core adjoining said first and outer rigid impact element, said intermediate and elastic expansion core being formed by a smelted bulk of a plurality of sheets selected from the group consisting essentially of polyvinyl butyral and polyurethane; and (c) a third and rigid protective sheet adjacent to the intermediate and elastic expansion core, said third and rigid protective sheet being formed by a laminated assembly of a glass sheet laminated with a last and outer rigid polycarbonate layer by using a thin film of plasticized polyurethane.

* * * * *